United States Patent
You et al.

(10) Patent No.: US 9,571,627 B2
(45) Date of Patent: Feb. 14, 2017

(54) MOBILE COMMUNICATION DEVICE WITH PUBLIC TRANSPORTATION DETECTION FOR DETERMINING HANDS FREE MODE SETTINGS

(71) Applicant: Motorola Mobility LLC, Chicago, IL (US)

(72) Inventors: Di You, Elmhurst, IL (US); Mir F Ali, Rolling Meadows, IL (US); Ishan Pande, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/748,910

(22) Filed: Jun. 24, 2015

(65) Prior Publication Data

US 2016/0381205 A1 Dec. 29, 2016

(51) Int. Cl.

| | | |
|---|---|---|
| H04M 3/00 | (2006.01) | |
| H04M 1/725 | (2006.01) | |
| H04W 4/02 | (2009.01) | |
| H04W 4/04 | (2009.01) | |
| H04W 84/12 | (2009.01) | |
| G01C 21/34 | (2006.01) | |
| H04W 64/00 | (2009.01) | |

(52) U.S. Cl.
CPC ......... H04M 1/72569 (2013.01); H04W 4/027 (2013.01); H04W 4/028 (2013.01); H04W 4/04 (2013.01); *G01C 21/3484* (2013.01); *H04W 64/00* (2013.01); *H04W 84/12* (2013.01)

(58) Field of Classification Search
CPC .. H04M 1/72569; H04W 4/027; H04W 4/028; H04W 4/04; H04W 84/12; H04W 64/00; G01C 21/3484
See application file for complete search history.

(56) References Cited

U.S. PATENT DOCUMENTS

| | | | | |
|---|---|---|---|---|
| 2013/0288704 | A1* | 10/2013 | Wirola | H04W 64/00 455/456.1 |
| 2015/0168174 | A1* | 6/2015 | Abramson | G01C 21/3697 701/408 |
| 2015/0271639 | A1* | 9/2015 | Ziskind | H04W 4/021 455/456.1 |

OTHER PUBLICATIONS

Leon Stenneth, Ouri Wolfson, Philip S. Yu, Bo Xu, "Transportation Mode Detection Using Mobile Phones and GIS Information," ACM SIGSPATIAL GIS '11, pp. 54-63 ( Chicago, IL, Nov. 1-4, 2011).

(Continued)

*Primary Examiner* — Barry Taylor
(74) *Attorney, Agent, or Firm* — Cygan Law Offices P.C.; Joseph T. Cygan (57) ABSTRACT

A mobile communication device includes wireless local area network (WLAN) baseband hardware with at least one WLAN transceiver; non-volatile, non-transitory memory that stores a transportation model based on aggregated basic service set identification (BSSID) information collected from a plurality of WLAN access points; at least one sensor that is operative to detect motion of the mobile communication device; and at least one processor, operatively coupled to the WLAN baseband hardware, the memory and to the at least one sensor. The at least one processor is operative to determine that the mobile communication device is located on public transportation using the transportation model in response to a motion detection signal received from the at least one sensor.

13 Claims, 5 Drawing Sheets

(56) References Cited

OTHER PUBLICATIONS

Yu Zheng, Quannan Li, Yukun Chen, Xing Xie, Wei-Ying Ma, "Understanding Mobility Based on GPS Data," UbiComp '08, pp. 1-10 (Seoul, Korea Sep. 21-24, 2008).

* cited by examiner

MOBILE COMMUNICATION DEVICE WITH PUBLIC TRANSPORTATION DETECTION FOR DETERMINING HANDS FREE MODE SETTINGS

FIELD OF THE DISCLOSURE

The present disclosure relates generally to mobile communications devices such as mobile telephones that incorporate hands free operation using text-to-voice capability and speaker phone capability.

BACKGROUND

Mobile communication devices are increasingly being integrated with additional sensors. These sensors provide a variety of functionality such that mobile communication devices are becoming more powerful in determining a user's context and providing meaningful actions based on the determined context.

One such context determination is in-vehicle usage. A mobile communication device can determine whether a user is in a moving vehicle or not by using sensor data from one or more of an accelerometer and audio sensor and location data. After the mobile communication device makes a determination that the user is in a vehicle, it can adjust settings for hands-free mode and to facilitate the user focusing on the road while driving.

For example, some existing mobile communication devices can announce a caller's name and read out a text message for the user if the determined context is that the user is in a vehicle. This context detection response is desirable if the user is driving a car, because it facilitates the driver keeping her eyes on the road rather than being tempted to look at the mobile communication device. However, if the user is on public transportation such as a bus or train, the same response would be awkward because the user may not want her caller's name or text message to be read out in front of other people around her. Unfortunately, current in-vehicle context detection methods fail to distinguish between when the user is driving a car and riding on public transportation. This is because the data used for this purpose appears similar with respect to a private car and public transportation vehicles.

One known system for in-vehicle context detection in a mobile communication device is Google's activity recognition system (available at: http://developer.android.com/training/location/activity-recognition.html). This system which is based on the Android™ operating system can recognize various user activities and includes determining when the mobile communication device is in-vehicle. However, the system cannot distinguish whether a user is in a personal car or is riding on public transportation.

Another known system for in-vehicle context detection in a mobile communication device is described by Zheng et al in "Understanding Mobility Based on GPS Data," ACM International Joint Conference on Pervasive and Ubiquitous Computing (2008) [hereinafter "Zheng"]. Zheng describes an approach for distinguishing among four classes that include walking, driving, bicycling and riding a bus, and uses GPS logs to make an inference of the class. However, Zheng does not provide any way to discriminate between a car and a bus, which is a form of public transportation, because the mobility patterns exhibited by GPS data are similar for a car and public transportation.

Another known system for in-vehicle context detection in a mobile communication device is described by Stenneth et al in "Transportation Mode Detection using Mobile Phones and GIS Information," Proceedings of the 19th ACM SIG-SPATIAL International Conference on Advances in Geographic Information Systems (2011) [hereinafter "Stenneth"]. Stenneth describes an approach to detect different transportation modes including car, train, bus etc. by using accelerometer data in addition to GPS data and also using specific transportation network information. Stenneth requires the transportation network information, noting that the GPS and accelerometer readings are similar for cars, trains and buses.

DETAILED DESCRIPTION

The present disclosure provides a mobile communication device and methods for determining whether a user is riding in a personal car or on public transportation such as a bus or train. Among other advantages, the methods of the present disclosure do not require knowledge of the underlying transportation network (such as knowledge of real time bus locations, and spatial bus stop information) which are time-consuming to obtain in advance.

One aspect of the present disclosure is a mobile communication device that includes wireless local area network (WLAN) baseband hardware with at least one WLAN transceiver; non-volatile, non-transitory memory that stores a transportation model based on aggregated basic service set identification (BSSID) information collected from a plurality of WLAN access points; at least one sensor that is operative to detect motion of the mobile communication device; and at least one processor, operatively coupled to the WLAN baseband hardware, the memory and to the at least one sensor. The at least one processor is operative to determine that the mobile communication device is located on public transportation using the transportation model in response to a motion detection signal received from the at least one sensor.

The transportation model may include a histogram for BSSIDs collected and aggregated from the plurality of WLAN access points. The at least one processor is further operative to determine that the mobile communication device is located on public transportation using the transportation model by identifying persistent BSSIDs using the histogram. The at least one processor is also operative to determine that the mobile communication device is located in private transportation using the transportation model by identifying a lack of persistent BSSIDs using the histogram. The at least one processor may also adjust settings of the mobile communication device in response to determining that the mobile communication device is located on public transportation.

Another aspect of the present disclosure is a method of operating a mobile communication device. The method includes determining that the mobile communication device is in motion based on mobile communication device sensor data; scanning for wireless local area network (WLAN) access points; accessing a transportation model based on aggregated BSSID information collected from a plurality of WLAN access points; and determining that the mobile communication device is located on public transportation using the transportation model.

Another aspect of the present disclosure is a method of generating a transportation model. The method includes collecting WLAN BSSID information from a plurality of mobile devices; determining a number of occurrences of each detected BSSID; performing a classification operation on the number of occurrences; and generating a transportation model using the classification operation for predicting that a mobile communication device is on public transportation or private transportation. The transportation model may then be stored in non-volatile, non-transitory memory on a mobile communication device. In some embodiments, the step of performing a classification operation includes applying the Random Forest algorithm to the number of occurrences.

Figure 1:
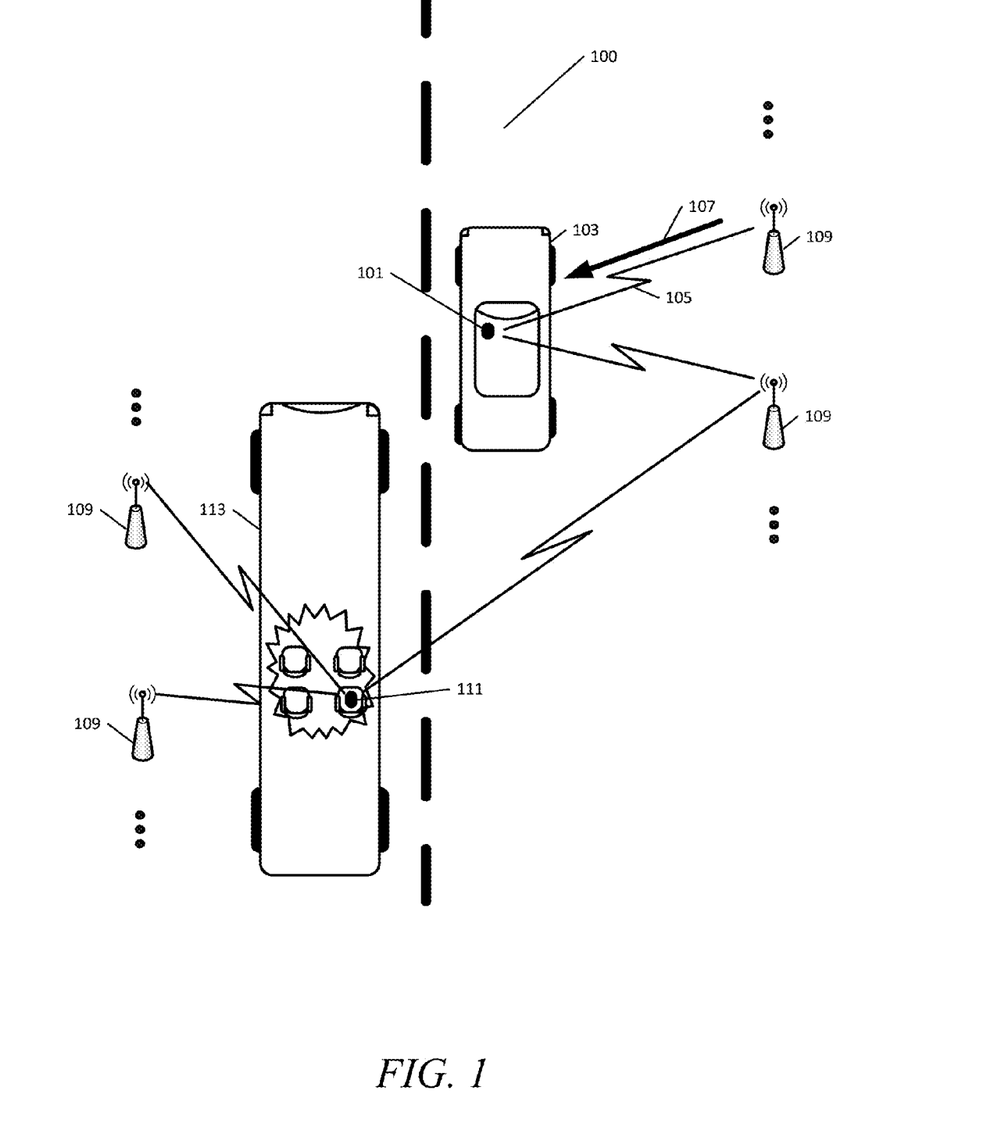
FIG. 1 is a diagram of a private or personal car and a public transportation vehicle traveling on a road.

Turning now to the drawings FIG. 1 illustrates a private or personal car 103 and a public transportation vehicle, i.e. a bus 113, traveling on a road 100. As the two types of vehicles progressed down the road 100, mobile communication devices within the vehicles will encounter various WLAN access points 109, assuming that their respective WLAN radio hardware is turned on and scanning for networks. A mobile communication device 101 that is owned and operated by the driver of the car 103 will obtain WLAN information 107 from the various WLAN access points 109 over a WLAN wireless link 105. Similarly, a passenger on the bus 113 may operate a mobile communication device 111 which also scans the various WLAN access points 109 and also receives WLAN information 107. In accordance with the embodiments, the mobile communication device 101 will be able to determine that it is located in a car 103 while the mobile communication device 111 will be able to determine that it is on a bus 113.

Figure 2:
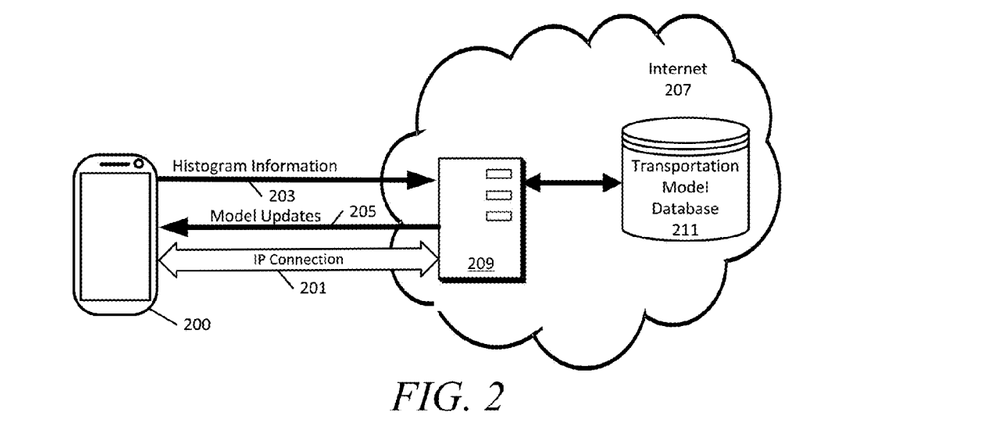
FIG. 2 is diagram of a mobile communication device in communication with a server in accordance with an embodiment.

FIG. 2 is diagram showing how both the mobile communication device 101 and the mobile communication device 111 may communicate with a server in accordance with an embodiment. Another example mobile communication device 200 may collect WLAN information 107 from various WLAN access points 109 encountered while the mobile communication device 200 user is traveling in a car or on public transportation such as a bus or train. When the mobile communication device 200 detects that it is in motion and is likely in a vehicle, a process is started to collect WLAN information 107 from any WLAN access points 109 and any WLAN hotspots encountered along the traveled route. The WLAN information 107 is used by the server 209 to build a transportation model database 211. In some embodiments, this process may be always running in the background and may begin to collect WLAN information 107 whenever the mobile communication device 200 determines that it is in motion. The user may receive a prompt on the display requesting that the user identify their mode of transportation, i.e. whether they are in a car, or on a bus or a train.

The mobile communication device 200 establishes an Internet Protocol (IP) connection 201 with the server 209 on the Internet 207 and sends histogram information 203 to the server 209. The histogram information 203 is created by the mobile communication device 200 from the collected WLAN information 107 and includes WLAN BSSID (basic service set identification) information for detected WLAN access points 109. The IP connection 201 may be established over a WLAN wireless link or over a wireless wide area network (WAN) such as a wireless telephone network. The server 209 includes or can access a transportation model database 211 which contains one or more transportation models.

In some embodiments, a transportation model may be pre-stored in the mobile communication device 200 based a location related to the mobile communication device 200 network service area. Alternatively, a transportation model may be downloaded or pushed to the mobile communication device 200 by the server 209 as a transportation model update 205. Additionally, transportation model updates 205 may be occasionally sent to the mobile communication device 200 by the server 209 as the mobile communication device 200 travels through routes having different WLAN access points 109.

The mobile communication device 200 includes an application or component that performs the data collection of WLAN information 107. More specifically, the mobile communication device 200 is operative to collect labeled training data from WLAN scans. The user is prompted by the application to designate whether the user is in a car, on a bus or on a train prior to the WLAN information 107 collection process. The server 209 is operative to collect the data from a group of mobile communication devices and to perform feature extraction using machine learning. The server 209 extracts discriminative features from collected WLAN information.

The features are calculated based on a histogram of the WLAN BSSID (basic service set identification) duration in a monitoring window. The value of the k-th feature is assigned as the total number of BSSIDs which appear exactly k times. The server 209 aggregates all collected mobile communication device data and applies feature extraction. The extracted discriminative features are determined using a histogram of the BSSID occurrences during the scans. In one example embodiment, a time window of 30 seconds may be used, with WLAN BSSID collection every 5 seconds such that 6 WLAN scans are conducted during the time window. In other words, the server 209 looks for how many unique BSSIDs appear in these scans, and then the total number of BSSIDs. A classification algorithm is then applied, for example Random Forest, to build a transportation model using the feature values obtained above. The transportation model created is then provided to the mobile communication devices for use in real-time public transportation detection.

Figure 3:
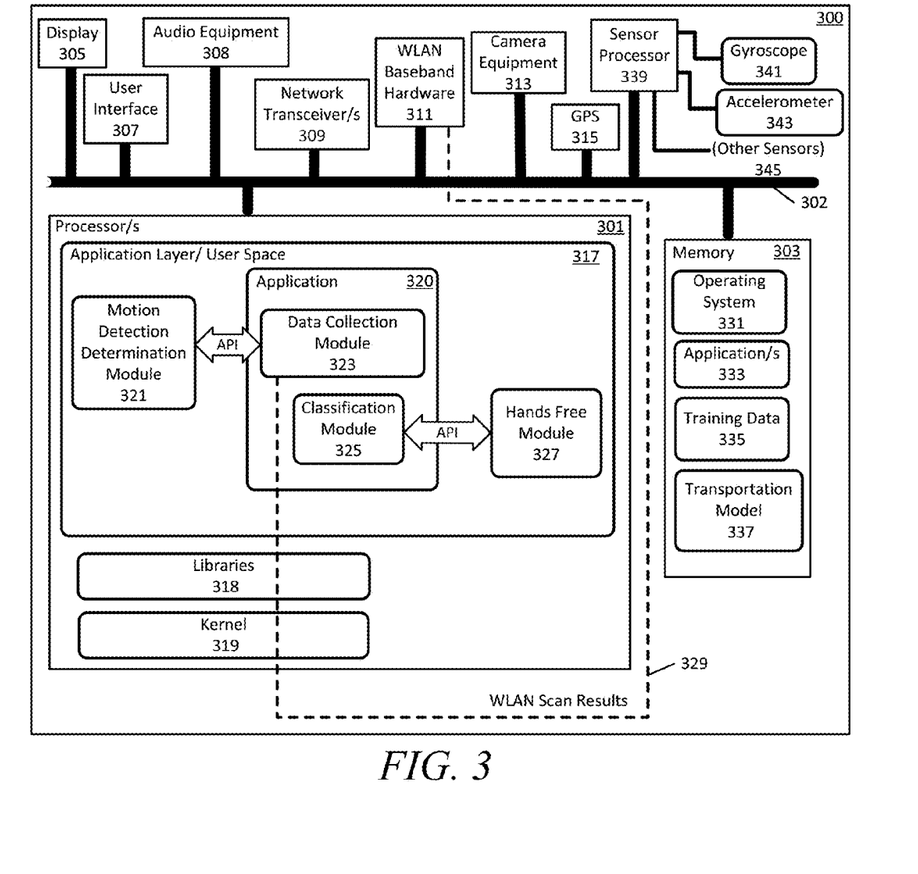
FIG. 3 is block diagram of a mobile communication device in accordance with an embodiment.

Further details of an embodiment are provided in FIG. 3 which is a block diagram of an example mobile communication device 300. The mobile communication device 300 includes one or more processors 301, a display 305 which is used to show a prompt to the user to provide a transportation type, user interface 307, audio equipment 308, one or more wide area network transceivers 309 (such as, but not limited to CDMA, UMTS, GSM, etc.), WLAN baseband hardware 311, camera equipment 313, GPS hardware 315, and memory 303. All of the components shown are operatively coupled to the one or more processors 301 by one or more internal communication buses 302. In some embodiments, a separate sensor processor 339 monitors sensor data from various sensors including a gyroscope 341 and an accelerometer 343 as well as other sensors 345. The gyroscope 341 and accelerometer 343 may be separate or may be combined into a single integrated unit. The audio equipment 308 may include, among other things, at least one microphone, at least one speaker, signal amplification, analog-to-digital conversion/digital audio sampling, echo cancellation, and other audio processing components, etc., which may be applied to one or more microphones and/or one or more speakers of the mobile communication device 300.

The memory 303 is non-volatile and non-transitory and stores executable code for an operating system 331 that, when executed by the one or more processors 301, provides an application layer (or user space) 317, libraries 318 (also referred to herein as "application programming interfaces" or "APIs") and a kernel 319. The memory 303 also stores executable code for various applications 333, training data 335 and a transportation model 337. The memory 303 may be operatively coupled to the one or more processors 301 via the internal communications buses 302 as shown, may be integrated with the one or more processors 301, or may be some combination of operatively coupled memory and integrated memory.

The one or more processors 301 are operative to launch and execute the applications 333 including a motion detection determination module 321, and an application 320 in accordance with the embodiments. The example application 320 may include a data collection module 323, and a classification module 325. However it is to be understood that the application 320 can be implemented in other ways that are contemplated by the present disclosure and that the example shown in FIG. 3 is only one possible implementation. For example the data collection module 323 and the classification module 325 may be separate applications or components or may be integrated together in some embodiments, etc.

The classification module 325 is operatively coupled to a hands free module 327 and is operative to change settings that impact operation of the mobile communication device 300. The classification module 325 may provide control signals and make settings changes to various components of the mobile communication device 300 and the hands free module 327 is only one example of a component that may receive control signals or commands. The control signals or commands may be sent over operative coupling that may be implemented via hardware connectivity in some embodiments or by appropriate APIs in embodiments where one or more components are implemented as software. In the example of FIG. 3, the hands free module 327 is operative to control when the mobile communication device 300 provides audible notifications and text-to-voice playback features, and when it can receive voice commands from the user among other settings.

Obtaining and sending the WLAN information 107 to the server 209 as shown in FIG. 2 is handled by the data collection module 323 which can communicate with the WLAN baseband hardware 311 over the internal communication buses 302. In some embodiments, when the application 320 is launched, the data collection module 323 may control the WLAN baseband hardware 311 to scan for networks and obtain WLAN information 107 including BSSID information. The application 320 may also access the GPS hardware 315 to obtain location information in some embodiments. Location information obtained over the WLAN may be an alternative in situations where GPS location information may not be available such as when indoors or other locations where GPS satellite data cannot be accessed. The location information may be used to geotag the WLAN information 107.

After obtaining WLAN information 107 using the WLAN baseband hardware 311, the application 320 may proceed as shown in FIG. 2 and may send histogram information 203 to the server 209 over an IP connection 201. In some embodiments, the transportation model 337 may be pre-stored in memory 303 as part of the application 320 installation. Otherwise, the mobile communication device 300 may obtain the transportation model 337 (or a transportation model update 205) over an IP connection 201 the server 209 described with respect to FIG. 2. The transportation model 337 or update may be obtained by a downloading operation, a server 209 push operation or any other appropriate mechanism.

The application 320 is operative to obtain the transportation model 337, or a transportation model update 205, from the server 209 and to store them in the memory 303. The transportation model 337 provides information used by the classification module 325 to make predictions of whether the mobile communication device 300 is in a car (i.e. private transportation), or is on a bus or train (i.e. public transportation) such that mobile communication device 300 settings may be adjusted in response to the determination, accordingly. For example, if the mobile communication device 300 is determined to be in private transportation, the classification module 325 will control the hands free module 327 such that a caller's name, text messages and notifications may be read out loud to the user using a text-to-voice application within applications 333. Likewise, if motion is detected by the motion detection determination module 321 (which would under default conditions also set the hands free module 327 as described above) and the classification module 325 determines that the mobile communication device 300 is on public transportation, the above mode settings would be prevented. In other words, the classification module 325 prevents the user's private information from being read aloud by text-to-voice over the audio equipment 308 speakers if the user is determined to be in a public setting.

Any of the components shown in FIG. 3 including without limitation the application 320, motion detection determination module 321, data collection module 323, classification module 325 and/or the hands free module 327 may be implemented as executable instructions executed by the one or more processors 301, or may be implemented as hardware, or as a combination of hardware and software/firmware. In embodiments in which one or more of these components is implemented as software, or partially in software/firmware, the executable instructions may be stored in the operatively coupled, non-volatile, non-transitory memory 303, that may be accessed by the one or more processors 301 as needed.

It is to be understood that any of the above described example components in the example mobile communication device 300 may be implemented as software (i.e. executable instructions or executable code) or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the mobile communication device 300 illustrated in FIG. 3 and described herein provides just one example embodiment and is not to be construed as a limitation on the various other possible implementations that may be used in accordance with the various embodiments.

More particularly, the data collection module 323 and/or the classification module 325 may be a single component or may be implemented as any combination of DSPs, ASICs, FPGAs, CPUs running executable instructions, hardwired circuitry, state machines, etc., without limitation. Therefore, as one example, the data collection module 323 and the classification module 325 may be integrated together and may be implemented using an ASIC or an FPGA that may be operatively coupled to a separate motion detection determination module 321 and to the hands free module 327. Likewise the hands free module 327 may be executed as code or may be implemented using an ASIC or an FPGA operatively coupled to the classification module 325 where the classification module 325 is also implemented using an ASIC or an FPGA. These example embodiments and other embodiments are contemplated by the present disclosure.

Figure 4:
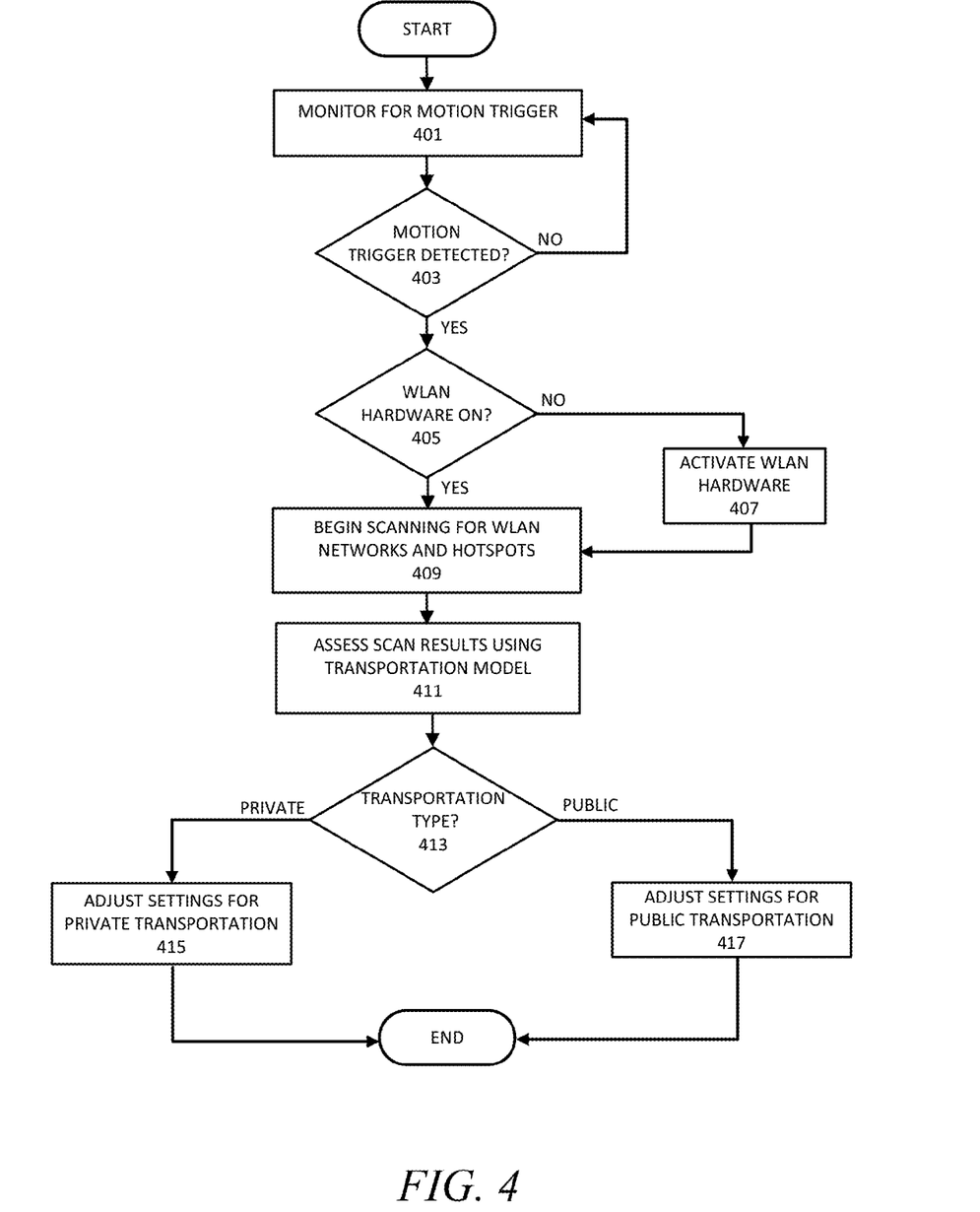
FIG. 4 is a flow chart showing operation of a mobile communication device in accordance with various embodiments.

The various operations of the example mobile communication device 300 shown in FIG. 3 are best understood in conjunction with the flowcharts of FIG. 4. Turning to FIG. 4, in operation block 401, the motion detection determination module 321 monitors the sensor processor 339 for a motion trigger. The motion trigger may occur in response to sensor data received by the gyroscope 341, the accelerometer 343, the other sensors 345, or various combinations of sensor data that may be used to determine that the mobile communication device 300 is in motion and is likely within a vehicle. In decision block 403, if a motion trigger is not detected, then the motion detection determination module 321 will continue to monitor for the motion trigger in operation block 401. However if the motion trigger is detected in decision block 403, the motion detection determination module 321 will invoke the data collection module 323 using an appropriate API from the libraries 318. The data collection module 323 will access any needed APIs from libraries 318 and communicate with the kernel 319 to determine if the WLAN baseband hardware 311 is turned on or not. If in decision block 405, the WLAN baseband hardware 311 is off, the data collection module 323 will send a command to activate the WLAN baseband hardware 311 and turn on the radio equipment as shown in operation block 407. Otherwise, if the WLAN baseband hardware 311 is already turned on in decision block 405, the data collection module 323 will begin to collect WLAN scan results 329 as shown in operation block 409. Also in operation block 409, the data collection module 323 builds a histogram of any detected unique BSSIDs. The WLAN scan results 329 contain the WLAN information 107 discussed with respect to FIG. 1. The data collection module 323 will pass information as necessary to the classification module 325. More particularly, the data collection module 323 will send the histogram representation to the classification module 325. In operation block 411, the classification module 325 will use the transportation model 337 contained in memory 303, and will assess the WLAN scan results 329 histogram using the transportation model 337.

As shown in decision block 413, the classification module 325 performs analysis of the WLAN scan results 329 and predicts the transportation type using the transportation model 337. The prediction that the transportation model 337 provides will depend on the classification algorithm utilized. For example, if Random Forest is used to build the transportation model 337, then the final prediction will be based on a majority vote of the predictions from each individual decision tree. Depending on whether the transportation type is determined to be public transportation or private transportation, the classification module 325 will access an appropriate API and will communicate with a hands-free module 327 and/or other components of the mobile communication device 300 and will change the settings accordingly. For example, if the transportation type is determined to be public transportation in decision block 413, the process will proceed to operation block 417 and adjust the settings for public transportation. Similarly, if the transportation type in decision block 413 is determined to be private transportation such as a car, the process will proceed to operation block 415 and will adjust settings for private transportation. The process then ends as shown.

It is to be understood that although the classification module 325 in FIG. 3 is shown communicating with the hands-free module 327, the classification module 325 and the application 320 may control any settings of the mobile communication device 300 including notification settings. For example, in some embodiments the classification module 325 may determine that the transportation type is public transportation. The settings adjusted in operation block 417 may include notification settings such that the user may be notified when an appropriate public transportation stop, such as bus stop, has been reached. Therefore if the mobile communication device 300 user is daydreaming or sleeping and not paying attention to the location of the bus, the mobile communication device 300 may produce an audible notification such that the user does not miss their bus stop.

Figure 5:
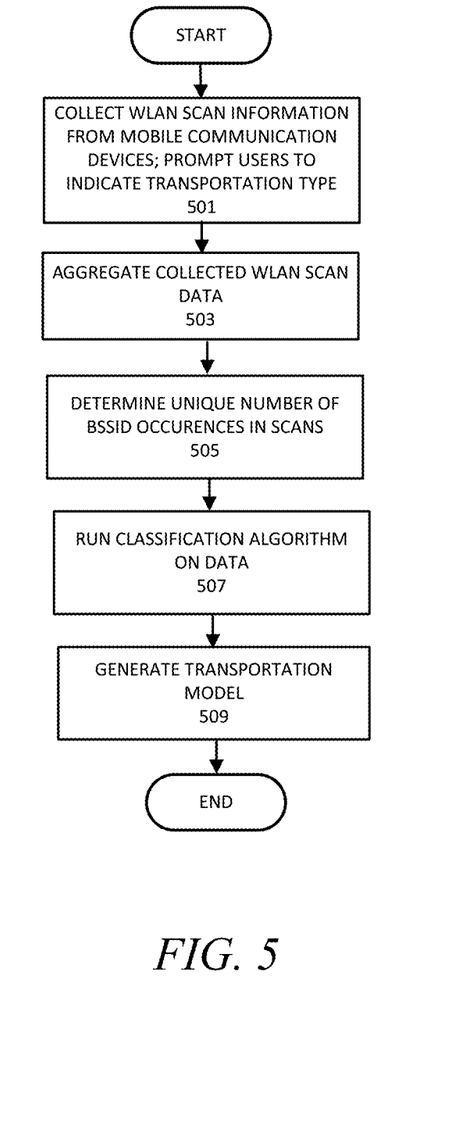
FIG. 5 is a flow chart showing operation of a server in accordance with various embodiments.

FIG. 5 is a flow chart showing operation of a server in accordance with various embodiments. The flowchart illustrates how the data collection module 323 from various mobile communication devices may be used by the server 209 shown in FIG. 2 to construct the transportation model database 211. Beginning in operation block 501, the data collection module 323 may be invoked by a motion trigger detected by the motion detection determination module 321 as was discussed previously with respect to FIG. 4. The data collection module 323 may then collect WLAN information 107 for various WLAN access points 109 encountered along a roadway or route as was discussed with respect to FIG. 1.

For the presently discussed application of the data collection module 323, the data collection module 323 may interact with the display 305 to show a prompt to the user such that the user may indicate (by providing input to the user interface 307) whether they are riding in a car, a bus or a train. In the present disclosure, a car is considered to be "private transportation," while a bus or a train are considered to be "public transportation." A taxicab, which is typically also a car, is considered to be private transportation for purposes of the present disclosure even though more than one passenger may be present in the taxicab.

In operation block 503, the server 209 receives histogram information 203 from one or more mobile communication devices 200 and aggregates the collected WLAN data. In operation block 505, the server 209 determines the unique number of BSSID occurrences in each of the scans and develops further data records and aggregation. In operation block 507, the server 209 runs a classification algorithm on the data. The classification algorithm may be for example Random Forest, which provides a way of averaging multiple deep decision trees which in this case are trained on different parts of the same WLAN BSSID training data with the purpose of, among other things, reducing the variance obtained on these multiple identical training data sets.

In operation block 509, the server 209 generates transportation model and stores it to the transportation model database 211. After the transportation model database 211 has been developed, the server 209 may send transportation model updates 205 to any of the participating mobile communication devices such as mobile communication device 200. The mobile communication devices may therefore use the transportation model updates 205 to update the local transportation model 337 that each of the mobile communication devices maintains stored in memory 303.

Figure 6:
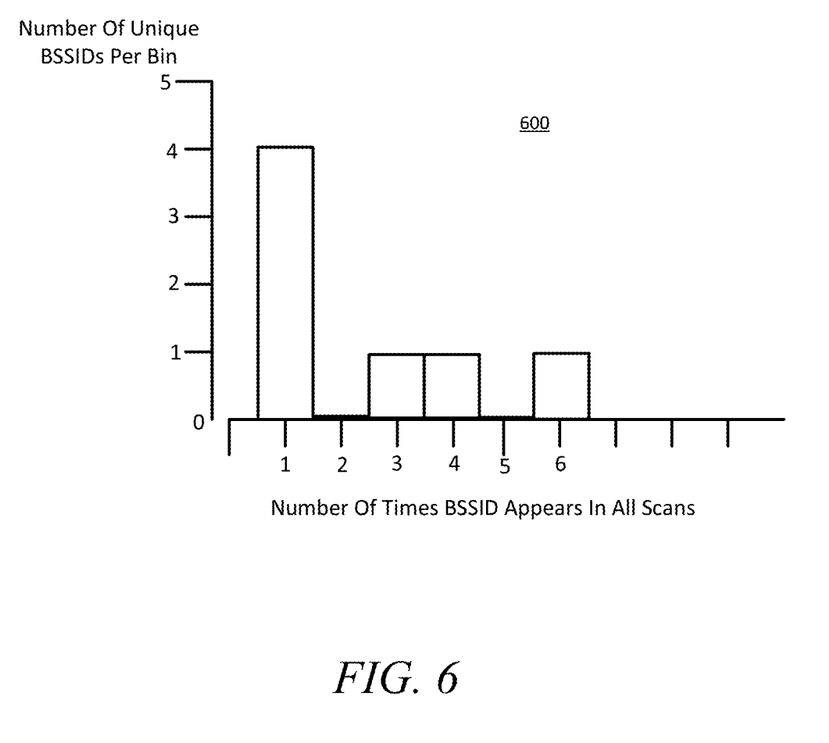
FIG. 6 is an example histogram for an example set of wireless local area network scans in accordance with various embodiments.

An example histogram 600 for an example set of wireless local area network scans in accordance with various embodiments is illustrated in FIG. 6. The histogram bins along the horizontal axis represent the number of times a BSSID appears in a scan set and the vertical axis value is the number of unique BSSIDs per each bin, i.e. bin six is related to the number of BSSIDs detected six times, etc. For example if six scans are conducted for a given scan interval, and using a simplified BSSID format "aN" for purposes of this example, the example scan results are as follows: scan 1 detected a1, a2, a3 and a4; scan 2 detected a1, a2 and a5; scan 3 detected a1 and a3; scan 4 detected a1 and a2; scan 5 detected a1, a3 and a6; and scan 6 detected a1, a3 and a7. Counting the number of times each detected BSSID appeared in the total six scans: a1 appeared six times; a2 appeared three times; a3 appeared four times; and a4, a5, a6 and a7 each appeared only one time.

In bin one, the number of BSSIDs that were detected only once is four (i.e. a4, a5, a6 and a7) therefore the vertical axis value for bin six is four. For the second bin, the number of BSSIDs that appeared twice is zero, therefore the vertical axis value for bin two is zero. For bin three, only a2 appeared three times and for bin four only a4 appeared four times, therefore bins three and four have a vertical axis value of one. There were no BSSIDs appearing five times so the vertical axis value for bin five is zero. For the sixth bin, BSSID a1 was the only BSSID detected six times therefore the vertical axis value for bin six is one. Accordingly the histogram 600 is generated for the six scans of the example.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A mobile communication device comprising:
   wireless local area network (WLAN) baseband hardware comprising at least one WLAN transceiver;
   non-volatile, non-transitory memory, storing a transportation model based on aggregated basic service set identification (BSSID) information collected from a plurality of WLAN access points, the transportation model comprising a histogram for BSSIDs collected and aggregated from the plurality of WLAN access points;
   at least one sensor, operative to detect motion of the mobile communication device where the at least one sensor is an accelerometer or gyroscope; and
   at least one processor, operatively coupled to the WLAN baseband hardware, the memory and to the at least one sensor, the at least one processor operative to:
      determine that the mobile communication device is located on public transportation using the transportation model histogram in response to a motion detection signal received from the at least one sensor; where public transportation is a vehicle selected from the group comprising: a bus and a train.

2. The mobile communication device of claim 1, wherein the histogram comprises bins along a first axis that represent the number of times a BSSID appears in a scan set and a second axis corresponding to the number of unique BSSIDs per each bin.

3. The mobile communication device of claim 2, wherein the at least one processor is further operative to determine that the mobile communication device is located on public transportation using the transportation model by identifying persistent BSSIDs using the histogram.

4. The mobile communication device of claim 2, wherein the at least one processor is further operative to determine that the mobile communication device is located in private transportation using the transportation model by identifying a lack of persistent BSSIDs using the histogram.

5. The mobile communication device of claim 1, wherein the at least one processor is further operative to adjust settings of the mobile communication device in response to determining that the mobile communication device is located on public transportation.

6. A method of operating a mobile communication device comprising:
   determining that the mobile communication device is in motion based on mobile communication device sensor data obtained from one of an accelerometer or gyroscope;
   scanning for wireless local area network (WLAN) access points and generating a histogram of detected BSSIDs from a plurality of WLAN access points detected during scanning;
   accessing a transportation model based on aggregated basic service set identification (BSSID) information collected from a plurality of WLAN access points; and
   determining that the mobile communication device is located on public transportation using the transportation model, where public transportation is a vehicle selected from the group comprising: a bus and a train.

7. The method of claim 6, wherein
generating a histogram of detected BSSIDs from a plurality of WLAN access points detected during scanning, comprises generating a histogram comprising bins along a first axis that represent the number of times a BSSID appears in a scan set and a second axis corresponding to the number of unique BSSIDs per each bin.

8. The method of claim 7, further comprising:
   determining that the mobile communication device is located on public transportation using the transportation model by identifying persistent BSSIDs using the histogram.

9. The method of claim 7, further comprising:
   determining that the mobile communication device is located in private transportation using the transportation model by identifying a lack of persistent BSSIDs using the histogram.

10. The method of claim 6, further comprising:
    adjusting settings of the mobile communication device in response to determining that the mobile communication device is located on public transportation.

11. A method comprising:
    collecting, by a server, WLAN BSSID information from a plurality of mobile devices;
    determining, by the server, a number of occurrences of each detected BSSID;
    performing, by the server, a classification operation on the number of occurrences; and
    generating, by the server, a transportation model using the classification operation for predicting that a mobile communication device is on public transportation or private transportation, the transportation model comprising a histogram that comprises bins along a first axis that represent the number of times a BSSID appears in a scan set and a second axis corresponding to the number of unique BSSIDs per each bin, where public transportation is a vehicle selected from the group comprising: a bus and a train and private transportation comprises a car.

12. The method of claim 11, further comprising:
storing the transportation model in non-volatile, non-transitory memory on a mobile communication device.

13. The method of claim 11, wherein performing a classification operation comprises:
applying the Random Forest algorithm to the number of occurrences.

* * * * *